3,730,952
AMIDE OXADIAZOLE POLYMERS AND
POLYMER PRECURSORS
Billy M. Culbertson, Burnsville, Minn., assignor to
Ashland Oil, Inc., Ashland, Ky.
No Drawing. Application Sept. 20, 1968, Ser. No. 761,306,
which is a continuation-in-part of application Ser. No.
502,322, Oct. 22, 1965. Divided and this application
July 23, 1970, Ser. No. 63,988
Int. Cl. C08g 20/04
U.S. Cl. 260—78 A            5 Claims

ABSTRACT OF THE DISCLOSURE

Thermally stable fibers and films have been prepared by reaction of equimolar quantities of an amino aroyl hydrazide and an acid dichloride. The polymers can be converted to the corresponding amide-oxadiazole polymers by dehydration.

---

This application is a division of application S.N. 761,306, filed Sept. 20, 1968 and now U.S. Pat. 3,642,711 which is a continuation-in-part of application S.N. 502,322 filed Oct. 22, 1965, and now abandoned.

This invention relates to novel polymers and to methods for their preparation; and, more particularly, it relates to novel polymers having recurring amide-oxadiazole units.

It is known in the prior art, such as that shown in U.S. Pat. 3,130,183, that polymeric materials can be prepared by the condensation of dihydrazides with dicarboxylic acid halides. The resulting compound is frequently referred to as a polyhydrazide, in that the characteristic unit which repeats along the polymer chain has the general formula:

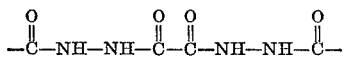

Furthermore, it is well known that such structures can be subjected to dehydration conditions to produce the corresponding oxadiazole structure:

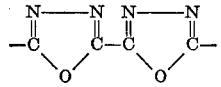

It is now been found that novel polymeric materials can be prepared by employing aminoarylhydrazides rather than dihydrazides of the prior art. The resulting polymer has a much greater order, which imparts a higher degree of crystallinity and provides polymers which can be made into stronger fibers, films, and other shaped articles.

It is an object of this invention to provide a novel polymer having recurring-amide-oxadiazole units. It is another object of this invention to provide a novel polymeric structure in which the polymeric backbone consists of alternating cyclic aromatic rings separated by carbonamide groups or by oxadiazole rings. It is still another object of this invention to provide a process for preparing a polymer having recurring amide-oxadiazole units. Still other objects will appear from the more detailed description of this invention which follows.

The foregoing objects are accomplished in accordance with this invention by providing a polymer:

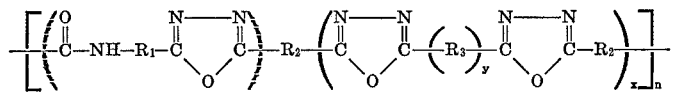

wherein $R_1$ is arylene, $R_2$ is alkylene or arylene, $R_3$ is alkylene or arylene, $x$ is zero or any positive integer, and $y$ is zero or 1. The symbol $n$ represents a number large enough to provide fiber and film forming polymers. Insofar as the amide oxadiazole moiety is unsymmetrical and can appear in the segments of the chain in head-to-head and head-to-tail fashion the dotted parentheses are employed above and hereinafter to connote that such moiety in any position along the polymer chain may be in reverse order with respect to any other such unit in the polymer chain.

In a given unit above characterized along the polymer chain $x$ may be the same or different value insofar as a dihydrazide precursor, where employed, may be employed in molar concentrations different from that of the amide hydrazide. In the preferred embodiment of this invention, the foregoing objects are accomplished by providing a polymer which consists essentially of recurring units having the general formula:

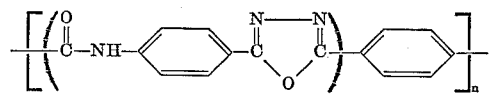

The polymers of this invention are prepared by employing a solution polymerization process or an interfacial polymerization process in which the monomeric materials are an aminoarylhydrazide, a dicarboxylic acid dichloride, and, optionally, a dihydrazide. These materials are reacted at room temperature and atmospheric pressure for a short reaction time to produce a polymeric structure having hydrazide recurring units.

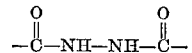

The polymer having these hydrazide units can then be converted to a polymer having recurring oxadiazole units by subjecting the intermediate polymer to dehydration conditions causing the hydrazide structure to cyclize into the oxadiazole unit.

One of the monomeric materials which is employed in the preparation of the polymer of this invention is an aminoarylhydrazide. The preferred material for this portion of the invention is any one of the three isomeric forms of aminobenzoyl hydrazide, i.e., the ortho-, meta- or the para-isomers. Other materials, which may be employed as alternate monomer compounds, are the substituted aminobenzoyl hydrazides, that is the benzoyl structures substituted with groups which do not interfere with the polymerization, such as halogen, alkyl, and the like. Typical compounds of the type suggested are aminomethylbenzoyl hydrazide, aminochlorobenzoyl hydrazide, and corresponding compounds in the isomeric forms mentioned above. Among other alternative compounds which might be employed would be those of the naphthyl series, e.g., aminonaphthoyl hydrazide, in any of its several isomeric forms.

The second monomeric material which is necessary in the process of this invention is a dicarboxylic acid dihalide. The dicarboxylic acid dihalide may be either an aromatic or an aliphatic compound. The aromatic structures will include those which appear in the various isomeric forms and, thus, for example would include phthaloyl dichloride, isophthaloyl dichloride, and terephthaloyl dichloride. The aromatic ring may be substituted by groups which do not interfere with the polymerization process, e.g., alkyl groups, thus including compounds such as methyl phthaloyl dichloride and methyl terephthaloyl dicholride.

The dicarboxylic acid dichlorides of the aliphatic series include any dibasic acid dichloride such as oxalic acid dichloride, malonic acid dichloride, succinic acid dichloride, glutaric acid dichloride, adipic acid dichloride, pimelic acid dichloride, suberic acid dichloride, azelaic acid dichloride, sebacic acid dichloride, and the like. The unsaturated dicarboxylic acid dichlorides are not suitable because of the reactivity of the unsaturated linkage.

Although the polymers of this invention may be made by the reaction of two components, i.e., an aminoarylhydrazide and a dicarboxylic acid dichloride, it is within the scope of this invention to employ another monomeric material, which may optionally be included among the reacting compounds employed in the manufacture of the polymer of this invention. Third third compound is a dihydrazide. The compound may be aromatic or aliphatic and, therefore, includes such materials as phthaloyl dihydrazide, isophthaloyl dihydrazide, terephthaloyl dihydrazide, all of the isomeric forms of naphthoyl dihydrazide, oxaloyl dihydrazide, malonoyl dihydrazide, succinoyl dihydrazide, glutaroyl dihydrazide, adipoyl dihydrazide, pimeloyl dihydrazide, suberoyl dihydrazide, sebacoyl dihydrazide, and the like. It is not necessary that these materials be unsubstituted since the aromatic rings or the aliphatic chains may be substituted by inert groups such as alkyls.

The polymeric products prepared from various combinations of the above-mentioned monomers are extremely difficult to name and may be more readily identified and understood as the reaction product of two or more specific monomeric materials.

In their simplest form the polymers are essentially linear chains of fiber and film-forming viscoities comprising the amide-hydrazide moiety,

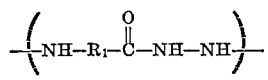

alternating with a dicarboxylic acid dichloride residue,

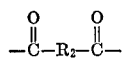

and, as above indicated, a portion generally less than about seventy-five mole percent of the amide-hydrazide may be replaced by a dihydrazide residue represented by the formula,

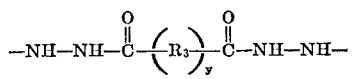

Thus, the reaction product of substantially equimolar amounts of p-aminobenzoylhydrazide and terephthaloyl dichloride results in a product having the following formula:

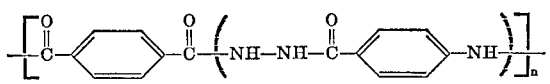

and when the polymer is subjected to dehydration, it produces a polymer having the following formula:

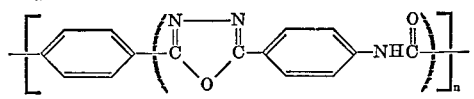

If one desires to prepare a product from the above two monomers and to include as the optional third monomer, terephthaloyl dihydrazide, the stoichiometry is changed by requiring a mole of the dichloride for each mole of each of the aminoarylhydrazide and the dihydrazide to produce the polymer having the following structure:

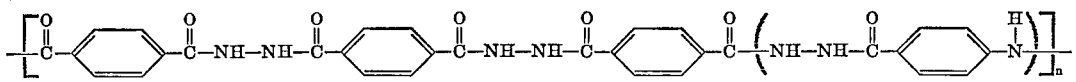

which, when it is dehydrated, produces the polymer having the following structure:

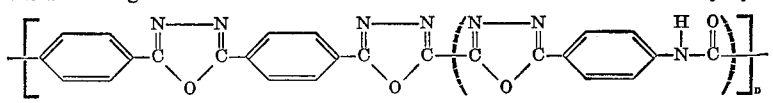

It may be seen that as one wishes to vary the composition of the polymers shown in the above formulas by including more or less of the optional component, the aryl dihydrazide there will be more or less of the corresponding dihydrazide component in the polymer chain. The polymers, which are therefore contemplated within the scope of this invention, include the reaction products of any the foregoing aminoarylhydrazides with any of the foregoing dicarboxylic acid dichlorides, as well as any of these reaction products modified by incorporating a portion of any of the foregoing dihydrazides to function as the third component of the materials going to make up the polymeric product.

The polymeric products, which are made in accordance with this invention, are produced by employing either of the techniques of solution polymerization or of interfacial polymerization. In the solution polymerization technique, the monomers are dissolved separately in the same solvent or in miscible solvents. The monomer solutions are then mixed to produce a single medium in which the polymerization takes place to produce a solution of the polymer. The polymer solution may be directly cast into films or spun in fibers or employed in the fabrication of other shaped articles. The amount of solvent which is employed is necessarily sufficient to maintain the polymer in solution and enough excess solvent to provide the polymer solution with a desired concentration and viscosity for its intended use.

In the interfacial polymerization, one of the monomers is dissolved in an organic solvent, which is a nonsolvent for the polymer and the other monomer is dispersed in an aqueous phase with the aid of a suitable emusifier and a proton acceptor which serves to neutralize the acid released during the polymerization. In the preferred embodiment of this invention, the dicarboxylic acid dichloride is dissolved in the organic solvent and the aminoarylhydrazide in the form of its hydrochloride is dispersed in the aqueous phase. The proton acceptors include materials such as sodium carbonate, magnesium carbonate, calcium carbonate, and tertiary amines, such as triethylamine, trimethylamine, and pyridine. The organic solution and the aqueous dispersion are then mixed and the polymer is formed at the interface between the organic and the aqueous phases. Although it is possible to prepare films and fibers at the interface by employing specialized techniques, it is more frequently the case that agitation is employed and the resulting polymer is produced in the form of particles.

Both the solution polymerization and the interfacial polymerization are preferably conducted at low temperatures such as $-30°$ to $50°$ C. although higher temperatures are operable. Elevated temperatures are not preferred since the polymerization is rapid at the lowest temperatures and since better control over the polymerization is achieved in that range of temperature.

The aminoarylhydrazide and the dicarboxylic acid dichloride are preferably employed in equimolar quantities, or as close as possible to equimolar quantities, since such proportions result in the highest molecular weight in the final polymeric product. The molecular weight of the polymer decreases as the proportion of monomers either lowered or increased from the equimolar point. If a third component, the dihydrazide, is also included in the monomers, there must be an equal proportion of dicarboxylic acid dichloride employed to react with the dihydrazide. In other words, the number of moles of dicarboxylic acid dichloride should be equivalent to the sum of moles of aminoarylhydrazide and dihydrazide.

The proportion of monomers employed results in an excellent means for controlling the molecular weight of the resulting polymer. It is generally preferred to polymerize the monomers to the highest possible molecular weight in order to achieve the best mechanical properties. There may, however, be applications, such as in the preparation of coatings, which do not require the optimum in mechanical properties but which are more concerned with the solubility of the polymer and the viscosity of the polymer solution, which, therefore, preferably employ a lower molecular weight polymer. The molecular weight of the amide-hydrazide polymer is measured by determining its inherent viscosity in a 0.5 g. solution of the polymer in 100 ml. of dimethylsulfoxide at 25° C. In order for the polymer to have desirable mechanical properties for the preparation of coatings or for the fabrication of shaped articles, such as fibers or films, the inherent viscosity should be at least 0.1, and preferably greater than 0.3.

The other reaction conditions are not critical. The process, which is employed, is normally atmospheric although super atmospheric and subatmospheric pressures may be employed if the temperatures are correspondingly modified. The reaction time is varied widely although it is generally preferred to allow the polymerization to go to completion which normally is accomplished in a matter of a few minutes.

This invention may be more readily understood by reference to the following examples, in which parts and percentages are by weight unless otherwise specified and temperatures are in degrees centigrade unless otherwise specified.

EXAMPLE 1

A solution was prepared by dissolving 2.775 g. of p-aminobenzoyl hydrazide in 100 ml. N-methylpyrrolidone (distilled from phosphorus pentoxide). To this solution was added 5.07 g. of solid terephthaloyl dichloride with rapid stirring at 0–10° C. After 30 minutes, the solution temperature was raised to room temperature and the stirring was continued at that temperature for an additional 3 hours. The resulting product was a viscous polymer solution, which was poured onto glass plates to cast free films. After drying overnight, the coated plates were dried in vacuum (approximately 5 mm. Hg) at 75° C. for 3 hours. The free films were somewhat brittle but could easily be stripped from the glass plates. A portion of the polymer solution was quenched by pouring it into vigorously agitated water. The separated poly(amide-hydrazide) was filtered, washed with hot water, digested twice in hot methanol, collected by filtration, and dried in vacuum (approximately 0.2 mm. Hg) at 80° C. for 3 hours. The polymer was obtained in quantitive yield and had an inherent viscosity of 1.89 in hexamethylphosphoramide (0.5% conc., at 25° C.).

The polymer was soluble in hexamethylphosphoramide, N,N-dimethylacetamide and dimethylsulfoxide. The elemental analysis of the polymer agreed well with its calculated value. Found (percent): C, 62.11; H, 4.78; N, 14.42. Calculated (percent): C, 64.05; H, 3.91; N, 14.95. The infrared analysis of the polymer in the form of a film indicated strong, board absorption bands at about 3,400–3,100 cm.$^{-1}$ (NH) and at 1,640–1,670 cm.$^{-1}$ (for amides).

The foregoing polymer was heated in an oven at 250° C.–350° C. in vacuum (5 mm. Hg). Dehydration was initiated at about 250° C., followed by cyclization to form 1,3,4-oxadiazole rings along the backbone of the polymer chain to produce poly[4,4'-(1,3,4-oxadiazolyl)benzanilide] of high molecular weight. The dehydration process was followed by reduction of the intensity of the broad absorption bands at 3,100–3,400 cm.$^{-1}$ and 1,640–1,670 cm.$^{-1}$, and by the appearance of a new characteristic band at 1,618 cm.$^{-1}$ (indicative of the 1,3,4-oxadiazole moiety). The cyclodehydrated polymer also indicated in its infrared spectrum two reasonably strong bands at 1,012 cm.$^{-1}$ and at 960 cm.$^{-1}$, attributable to 1,3,4-oxadiazole units (=C—O—C=O stretching). Cyclodehydration was also observed when nitrogen was employed as the atmosphere rather than air at 250°–350° C. A sample of the poly(amidehydrazide) was heated in a nitrogen atmosphere at 300° C. for 2 hours and produced the following analysis. Calculated (percent): C, 68.44; H, 3.41; N, 15.96. Found (percent): C, 67.87; H, 3.96; N, 15.77. Isothermal weight loss studies at 350° C. indicated that the polymer was essentially cyclodehydrated after 1 hour at 350° C.

The cyclodehydrated polymer was found to be insoluble in highly polar solvents such as N,N-dimethylformamide, N,N-dimethylacetamide, dimethylsulfoxide, N-methylpyrrolidone, and hexamethylphosphoramide.

The thermal stability of the cyclodehydrated polymer described above was compared with that of a random amide hydrazide polymer (prepared from 2.42 g. of isophthaloyl dihydrazide, 2.50 g. of 4,4'-diaminodiphenyl ether, and 5.07 g. of terephthaloyl dichloride) prepared with the same polymerization process and isolation techniques as described above in this example for the previous polymer. The resulting random polymer had an inherent viscosity of 1.30 in hexamethylphosphoramide. This polymer was cyclodehydrated as described above and tested for its thermal stability. Both polymers were tested for thermal stability in both nitrogen and air by thermogravimetric methods. The first described polymer was stable in both nitrogen and air to about 480° C. while the random polymer was stable only to about 450° C.

EXAMPLES 2–17

In a series of experiments, the three isomers of aminobenzoylhydrazide and the three isomers of phthaloyl dichloride were employed to prepare polymers by the process of this invention employing either solution polymerization techniques or interfacial polymerization techniques. In the latter procedure, the aminoarylhydrazide was dissolved in chloroform containing potassium hydroxide as an acid acceptor. In the solution polymerization technique, four different solvents were employed, two of which, N-methylpyrrolidone and hexamethylphosphoramide, were sufficiently basic to act as acid acceptors in themselves, while the other two, dimethylformamide and dimethylacetamide, required the presence of additional acid acceptors such as pyridine or triethylamine. All polymerizations were run at room temperature. The results are shown in the following tabulation:

TABLE I

| Example | Monomers | Polymerization method | Solvent | Inherent viscosity |
|---|---|---|---|---|
| 2 | O-aminobenzoyl hydrazide terephthaloyl dichloride | Interfacial | Water-chloroform | 0.142 |
| 3 | do | Solution | Dimethylformamide | 0.104 |
| 4 | do | do | do | 0.105 |
| 5 | M-aminobenzoyl hydrazide isophthaloyl dichloride | do | do | 0.398 |
| 6 | M-aminobenzoyl hydrazide terephthalyol dichloride | do | do | 0.862 |
| 7 | P-aminobenzoyl hydrazide phthaloyl dichloride | do | do | |
| 8 | P-aminobenzoyl hydrazide isophthaloyl dichloride | Interfacial | Water-chloroform | 0.192 |
| 9 | do | Solution | Dimethylformamide | 0.216 |
| 10 | do | do | Dimethylacetamide | 0.871 |
| 11 | do | do | Hexamethylphosphoram de | 0.611 |
| 12 | do | do | Dimethylformamide | 1.200 |
| 13 | do | do | do | 0.740 |
| 14 | P-aminobenzoyl hydrazide terephthaloyl dichloride | Interfacial | Water-chloroform | 0.339 |
| 15 | do | Solution | Dimethylformamide | 1.890 |
| 16 | do | do | do | 1.234 |
| 17 | P-aminobenzoly hydrazide sebacoyl dichloride | do | do | 0.668 |

The inherent viscosities were determined employing standard methods although different solvents were used in some instances. Hexamethylphosphoramide was used as the solvent in the inherent viscosity determination in Examples 2, 8, 9 and 11–16 dimethylformamide was employed in Examples 3–6 and dimethylacetamide was employed in Examples 10 and 17.

All of the solution polymerization runs (except Example 16) produced a homogeneous solution. In Examples 4, 5, 6, 11, 12, 13 and 17 the polymer solutions were employed to cast free films on glass plates which after drying in a vacuum oven at 60° C. (1 mm. Hg) for 2 hours were readily stripped from the glass plate. The films had excellent color, good tensile strength, good crease resistance, and were self extinguishable when exposed to the flame of a match.

Employing the techniques of differential thermal analysis and thermogravimetric analysis, the polymer of Example 15 was tested to determine its thermostability by heating it up to 450° C. The polymer was found to lose approximately 14% of its weight (approximately 10% of the weight is calculated to be lost due to cyclization). The other 4% of the weight loss is attributed to the loss of water absorbed and held by the hydrazide linkage. Polymers such as those of Example 17, which have aliphatic segments are stable up to about 350°–375° C.

Fibers having excellent tensile strength were drawn from the melt of Example 17. The polymer from this example melted at about 280°–282° C. and began to decompose in air at slightly higher temperatures (approximately 300° C.).

EXAMPLE 18

In a series of runs, a polymer was prepared having the same general characteristics and prepared by the same process as described in Examples 12 and 13. The polymerization of this polymer was stopped at various times in order to determine the effect of reaction time on molecular weight. The following results were obtained:

| Run: | Inherent viscosity | Elapsed time, hour |
|---|---|---|
| A | 0.893 | 0.5 |
| B | 0.915 | 1 |
| C | 0.893 | 2 |
| D | 0.899 | 4 |
| E | 0.905 | 8 |
| F | 0.822 | 24 |

It would appear from these data that there is essentially no molecular weight difference in the polymer obtained up to about 8 hours of reaction time and after that amount of time, the polymer degrades slightly with ensuing reaction times.

Although the invention has been described in considerable detail with reference to certain preferred embodiments thereof, it will be understood that variations and modifications can be effected within the spirit and scope of the invention as described hereinabove and as defined in the appended claims.

I claim:

1. A fiber or film-forming polymer consisting essentially of units having the formula

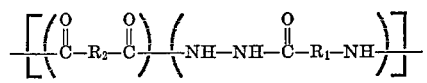

wherein $R_1$ is arylene and $R_2$ is alkylene and wherein the dotted parentheses connote that the moieties therein are present in two forms along the polymer chain, in the arrangement as depicted in the above formula and in the reverse order thereof.

2. The polymer of claim 1 wherein $R_1$ is phenylene.
3. The polymer of claim 1 wherein $R_2$ contains from one to eight carbon atoms.
4. The polymer of claim 3 wherein $R_1$ is phenylene.
5. A fiber or film-forming amide-oxadiazole polymer obtained by cyclodehydration of the polymer of claim 1.

References Cited

UNITED STATES PATENTS

| 2,252,555 | 8/1941 | Carothers | 260—78 A |
| 2,688,011 | 8/1954 | Wheatley et al. | 260—78 A |
| 2,831,834 | 4/1958 | Magat | 260—78 R |
| 3,130,182 | 4/1964 | Frazer | 260—78 TF |
| 3,232,910 | 2/1966 | Preston | 260—78 TF |
| 3,376,268 | 4/1968 | Preston | 260—78 TF |
| 3,376,269 | 4/1968 | Preston | 260—78 TF |
| 3,642,711 | 2/1972 | Culbertson | 260—78 A |

HAROLD D. ANDERSON, Primary Examiner

U.S. Cl. X.R.

260—30.6 R, 30.8 DS